US011941208B2

(12) United States Patent
Usui

(10) Patent No.: US 11,941,208 B2
(45) Date of Patent: Mar. 26, 2024

(54) INPUT DEVICE AND AUTOMOBILE INCLUDING THE SAME

(71) Applicant: ROHM CO., LTD., Kyoto (JP)

(72) Inventor: Hirotoshi Usui, Kyoto (JP)

(73) Assignee: ROHM CO., LTD., Kyoto (JP)

(*) Notice: Subject to any disclaimer, the term of this patent is extended or adjusted under 35 U.S.C. 154(b) by 0 days.

(21) Appl. No.: 16/694,061

(22) Filed: Nov. 25, 2019

(65) Prior Publication Data

US 2020/0167035 A1     May 28, 2020

(30) Foreign Application Priority Data

Nov. 27, 2018   (JP) .................... 2018-221259

(51) Int. Cl.
*G06F 3/042*       (2006.01)
*B60R 11/02*       (2006.01)
*G06V 40/10*       (2022.01)

(52) U.S. Cl.
CPC ........ *G06F 3/0425* (2013.01); *B60R 11/0264* (2013.01); *G06V 40/107* (2022.01); *G06F 2203/04104* (2013.01)

(58) Field of Classification Search
CPC ......... G06F 2203/04104; G06F 3/0425; G06F 3/044; G06F 3/041; G06F 3/04883; G06F 3/0393; G06K 9/00375; G06K 9/00355; G06K 9/00389; B60R 11/0264; G06V 40/107; G06V 40/113; G06V 40/28
See application file for complete search history.

(56) References Cited

U.S. PATENT DOCUMENTS

| 5,483,261 A   * | 1/1996 | Yasutake ............... G06F 3/0425 178/18.03 |
| 7,420,155 B2 * | 9/2008 | Mizota .................... G01L 5/228 250/221 |
| 7,707,001 B2 * | 4/2010 | Obinata ................ G01N 19/02 702/41 |
| 2007/0222766 A1* | 9/2007 | Bolender ............... G06F 3/044 345/173 |
| 2008/0211779 A1* | 9/2008 | Pryor .................. G06F 3/04847 345/173 |
| 2008/0218515 A1* | 9/2008 | Fukushima .......... H04N 13/398 345/424 |

(Continued)

FOREIGN PATENT DOCUMENTS

JP     2000040147 A   *  2/2000
JP     2003216321 A   *  7/2003
(Continued)

OTHER PUBLICATIONS

JPO Notice of Reasons for Refusal corresponding to JP Application No. 2018-221259, dated Sep. 20, 2022.
(Continued)

*Primary Examiner* — Temesghen Ghebretinsae
*Assistant Examiner* — Karin Kiyabu
(74) *Attorney, Agent, or Firm* — CANTOR COLBURN LLP

(57) ABSTRACT

An input device includes: a housing including a transparent base; a touch sensor installed on the transparent base; and a camera installed inside the housing to monitor an outside of the housing via the transparent base.

6 Claims, 12 Drawing Sheets

(56) References Cited

U.S. PATENT DOCUMENTS

| | | | | |
|---|---|---|---|---|
| 2009/0267921 | A1* | 10/2009 | Pryor | B60K 35/00 345/177 |
| 2011/0181545 | A1* | 7/2011 | Takahashi | G06F 3/041 345/174 |
| 2012/0287081 | A1* | 11/2012 | Akai | G06F 3/0446 345/174 |
| 2013/0030815 | A1* | 1/2013 | Madhvanath | G06F 3/0482 704/275 |
| 2013/0147743 | A1* | 6/2013 | Ludwig | G06F 3/0421 345/173 |
| 2014/0201674 | A1* | 7/2014 | Holz | G06F 3/0346 715/782 |
| 2015/0082897 | A1* | 3/2015 | Kim | G06F 3/0445 73/776 |
| 2016/0259473 | A1* | 9/2016 | Kim | G01N 33/0001 |
| 2018/0300051 | A1* | 10/2018 | Kim | G06F 3/017 |
| 2019/0311190 | A1* | 10/2019 | Wang | G06T 7/11 |
| 2020/0257373 | A1* | 8/2020 | Jeon | G06F 3/017 |
| 2021/0229555 | A1* | 7/2021 | Salahat | B60K 35/00 |

FOREIGN PATENT DOCUMENTS

| | | | |
|---|---|---|---|
| JP | 2009252105 | A * | 10/2009 |
| JP | 2009252105 | A | 10/2009 |
| JP | 2014209336 | A | 11/2014 |
| JP | 2015512540 | A | 4/2015 |
| JP | 2015092422 | A * | 5/2015 |
| JP | 2016051436 | A | 4/2016 |
| JP | 2016511488 | A | 4/2016 |
| JP | 2017102770 | A | 6/2017 |

OTHER PUBLICATIONS

JPO Notice of Reasons for Refusal corresponding to JP Application No. 2018-221259; dated Mar. 14, 2023.

* cited by examiner

INPUT DEVICE AND AUTOMOBILE INCLUDING THE SAME

CROSS-REFERENCE TO RELATED APPLICATION

This application is based upon and claims the benefit of priority from Japanese Patent Application No. 2018-221259, filed on Nov. 27, 2018, the entire contents of which are incorporated herein by reference.

TECHNICAL FIELD

The present disclosure relates to an input device.

BACKGROUND

In various applications, input devices are used to convert user's intentions into electrical signals for various purposes. In the related art, the input devices are mechanical switches or buttons, and in recent years, electronic input devices such as touch panels have been provided.

Whether an input is intended or not intended by a user cannot be distinguished only in the touch panel. Further, when a capacitance switch is used, water drops may be erroneously detected.

Further, in the related art, it may be said that the touch panel is optimized for fine input because of its high resolution. However, in a case where the touch panel is operated during driving, since the user cannot watch the touch panel, it is difficult for the user to perform fine input. Therefore, in such a case, an input device suitable for detecting an intuitive or rough input using a palm, a finger, an arm, or the like is desired.

SUMMARY

Some embodiments of the present disclosure provide an input device.

According to one embodiment of the present disclosure, there is provided an input device. The input device includes: a housing including a transparent base; a touch sensor installed on the transparent base; and a camera installed inside the housing to monitor an outside of the housing via the transparent base.

Further, arbitrarily combining the foregoing components or substituting the expressions of the present disclosure with each other among a method, an apparatus, a system, and the like is also effective as an embodiment of the present disclosure.

DETAILED DESCRIPTION

Outline of the Embodiment

Figure 1:
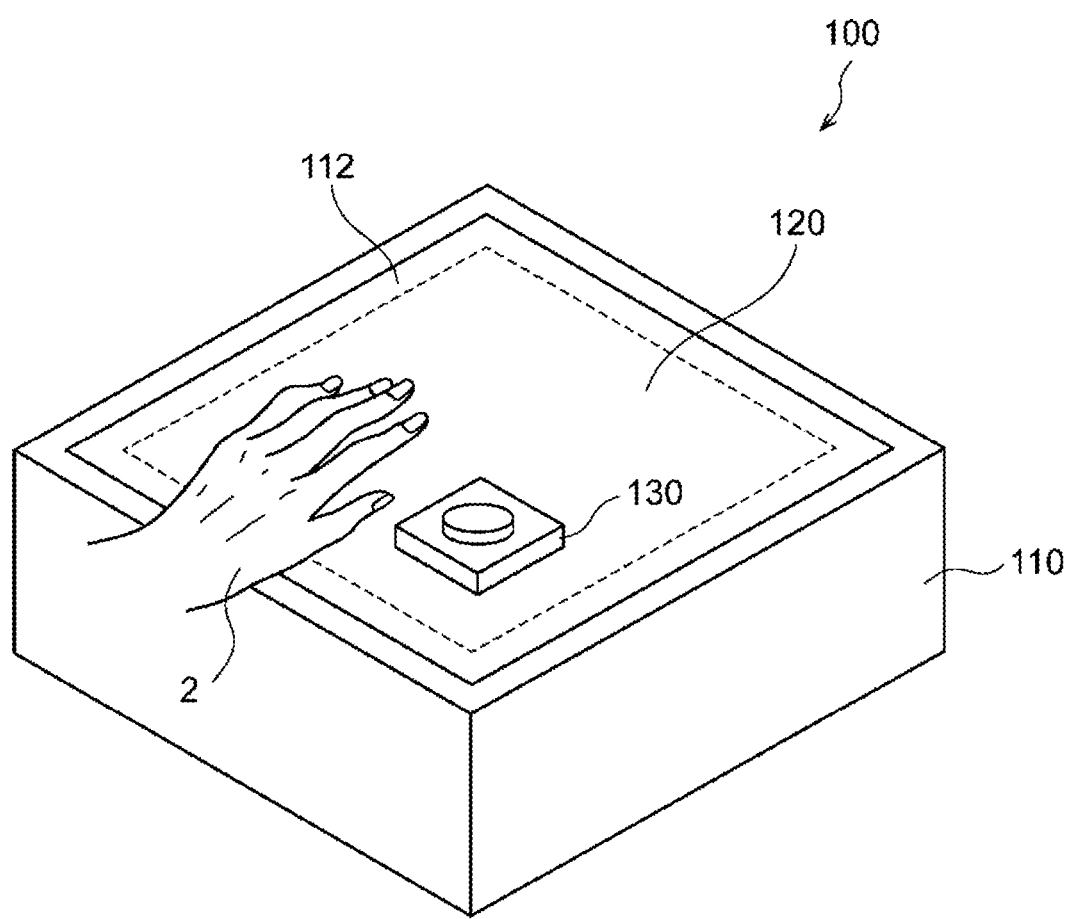
FIG. 1 is a perspective view of an input device according to an embodiment of the present disclosure.

An embodiment of the present disclosure relates to an input device. The input device includes a housing including a transparent base, a touch sensor installed on the base, and a camera which is installed inside the housing and monitors the outside via the base.

According to the present embodiment, it is possible to provide an operation input, which cannot be provided by an input device of the related art, by combining a camera image and an output of the touch sensor.

The input device may further include a processing part for receiving an output of the camera and the output of the touch sensor. Alternatively, the processing by the processing part may be externally performed.

The input device may be used by a predetermined user. At this time, the processing part may determine whether or not a current input to the touch sensor is by the predetermined user based on the output of the camera. Thus, an input other than the predetermined user may be invalidated.

The processing part may determine a direction of the user's palm based on the output of the camera. In so doing, it can be distinguished whether the user's palm is directed to the input device, the back of the user's hand is directed to the input device, or the user's palm is directed vertically to the input device, thereby enabling gesture input using the direction of the hand. Alternatively, only a specific state may be treated as a valid input.

The processing part may determine a shape of the user's hand based on the output of the camera. Rock, scissors, paper, hand signs, and shapes in which the number of fingers bent (the numbers of fingers stretched) is different are exemplified as variations of the shape of the hand.

The input device may be used by a plurality of users accessing from different directions. The processing part may determine whether the current input to the touch sensor is by which user based on the output of the camera. For example, when two users face each other across the input device, it is possible to determine which user's input is input to the touch sensor by determining the hand of that user based on the camera image.

The base may be flat. The base may have a curved surface.

The present disclosure will now be described with reference to the drawings based on an exemplary embodiment. Like or equivalent components, members, and processes illustrated in each drawing are given like reference numerals and a repeated description thereof will be properly omitted. Further, the embodiment is presented by way of example only, and is not intended to limit the present disclosure, and any feature or combination thereof described in the embodiment may not necessarily be essential to the present disclosure.

In the present disclosure, "a state where a member A is connected to a member B" includes a case where the member A and the member B are physically directly connected or even a case where the member A and the member B are indirectly connected through any other member that does not substantially affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the member A and the member C or the member B and the member C or does not impair function and effects achieved by combinations of the member A and the member C or the member B and the member C, in addition to a case where the member A and the member C or the member B and the member C are directly connected.

FIG. 1 is a perspective view of an input device 100 according to an embodiment of the present disclosure. The input device 100 includes a housing 110, a touch sensor 120, and a camera 130. The housing 110 has a transparent base 112 on its upper surface. In the present embodiment, the base 112 is flat.

The touch sensor 120 is installed on the base 112. The touch sensor 120 may be a capacitance switch in some embodiments, and in the present disclosure, the touch sensor 120 may include a non-contact type proximity sensor. In FIG. 1, an outer shape of the touch sensor 120 is illustrated as a rectangle, but this is not intended to limit the arrangement or shape of electrodes.

The input device 100 monitors a state of a hand 2 or finger of the user to determine an occurrence of effective input and a type of the input.

The camera 130 is installed inside the housing 110 and monitors the outside of the housing 110 via the base 112. Therefore, the panel of the base 112 and the touch sensor 120 is transparent at least in a wavelength region where the camera 130 has sensitivity.

Figure 2:
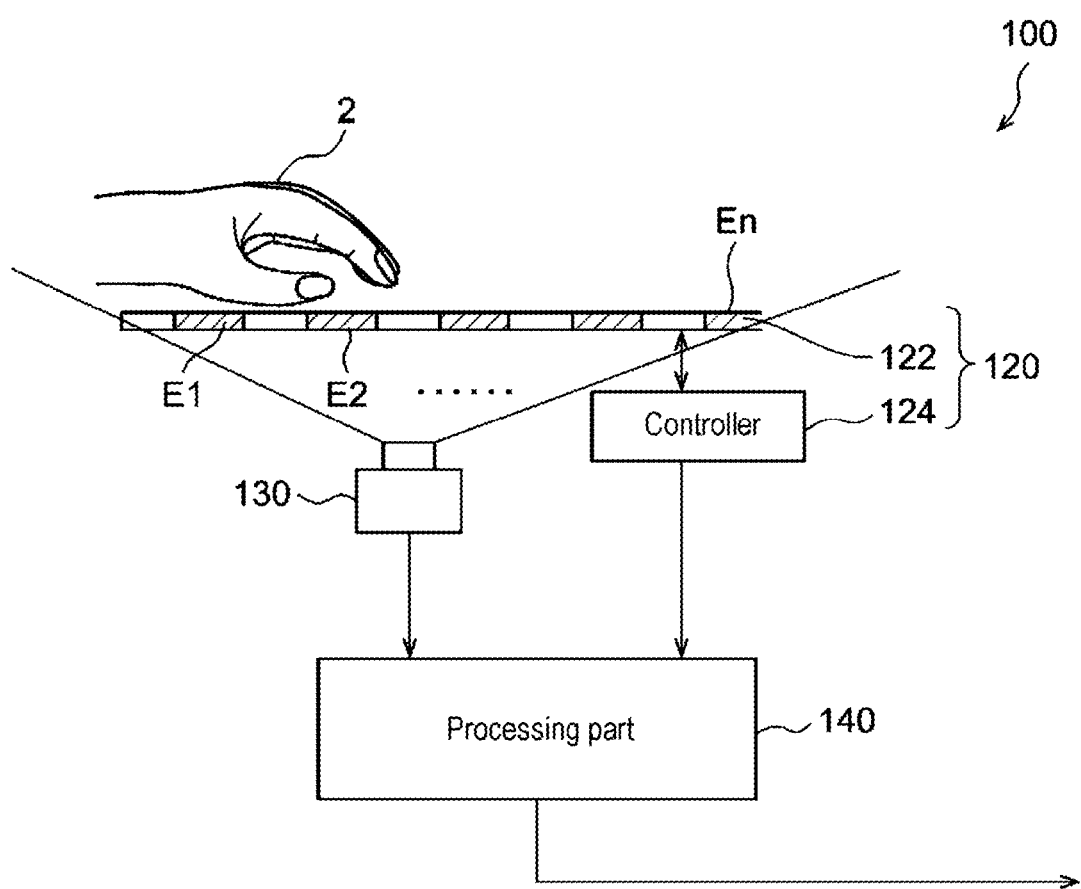
FIG. 2 is a block diagram of the input device in FIG. 1.

FIG. 2 is a block diagram of the input device 100 in FIG. 1. The touch sensor 120 includes a panel 122 and a panel controller 124. The panel 122 includes a plurality of electrodes E1 to En. The panel controller 124 controls the plurality of electrodes E1 to En, and detects capacitances respectively formed between the electrodes and the user's hand 2. Based on values, distribution and combination of a plurality of detected capacitances, the panel controller 124 may determine (i) which electrode the user's hand 2 is close to, and (ii) how close the user's hand 2 is to the panel 122.

The processing part 140 receives the output of the camera 130 and the output of the touch sensor 120, integrally processes them, and determines whether there is an input by the user, a type of the input, which user is providing an input when there is a plurality of users, and the like. The processing part 140 may be, for example, a processor.

The basic configuration of the input device 100 has been described above. According to the input device 100, it is possible to provide a novel or new operation input, which could not be provided by the input device of the related art, by combining the image of the camera 130 and the output of the touch sensor 120. Furthermore, it is possible to discriminate a change in capacitance due to adhesion of water droplets or dust and a change in capacitance due to user's input based on the image of the camera.

Hereinafter, a specific usage mode of the input device 100 will be described.

Figure 3A:
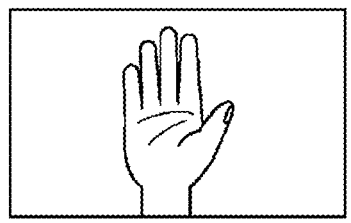
FIG. 3A to FIG. 3H are diagrams illustrating examples of camera images.
Figure 3B:
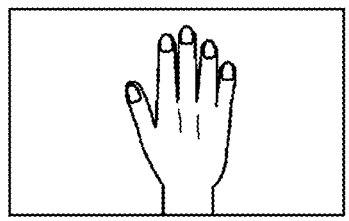
Figure 3C:
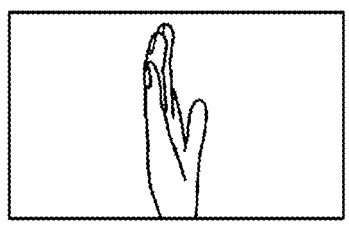
Figure 3D:
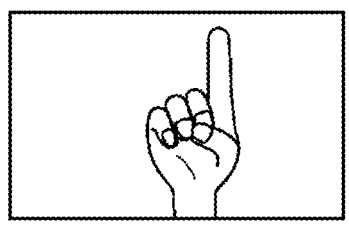

FIG. 3A to FIG. 3H are diagrams illustrating examples of camera images. FIG. 3A to FIG. 3H all illustrate inputs by a right hand. FIG. 3A illustrates an input by the palm, FIG. 3B illustrates an input by the back of the hand, FIG. 3C illustrates an input by a hypothenar, and FIG. 3D illustrates an input by an index finger. The validity/invalidity of the input and the type of the input may be determined by a combination of shapes of the hand as illustrated in FIG. 3A to FIG. 3D and a position of the touch sensor 120.

For example, when only the input by the palm is permitted, the output of the touch sensor 120 may be validated only when the palm is detected by the camera 130 as illustrated in FIG. 3A. Therefore, when the user unintentionally hits the back of the hand or the hypothenar against the touch sensor 120, they may be excluded as noise.

Figure 3E:
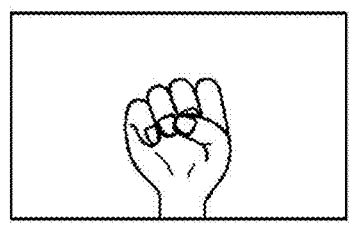
Figure 3F:
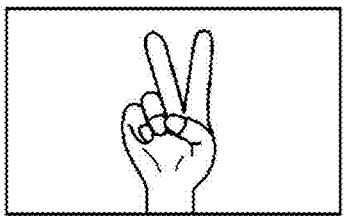
Figure 3G:
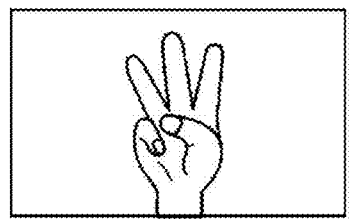
Figure 3H:
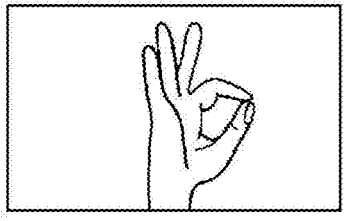

FIG. 3E to FIG. 3G are examples of gesture input based on the shapes of the user's hand. For example, when the user wants to input a number, the user can designate the number with fingers as illustrated in FIG. 3E to FIG. 3G. Multi-point detection can be also performed only by the touch sensor 120, but the numeric input may be accepted only by the camera image according to the input device 100. Furthermore, as illustrated in FIG. 3H, a so-called OK sign may be detected and used as a trigger for input determination.

Figure 4:
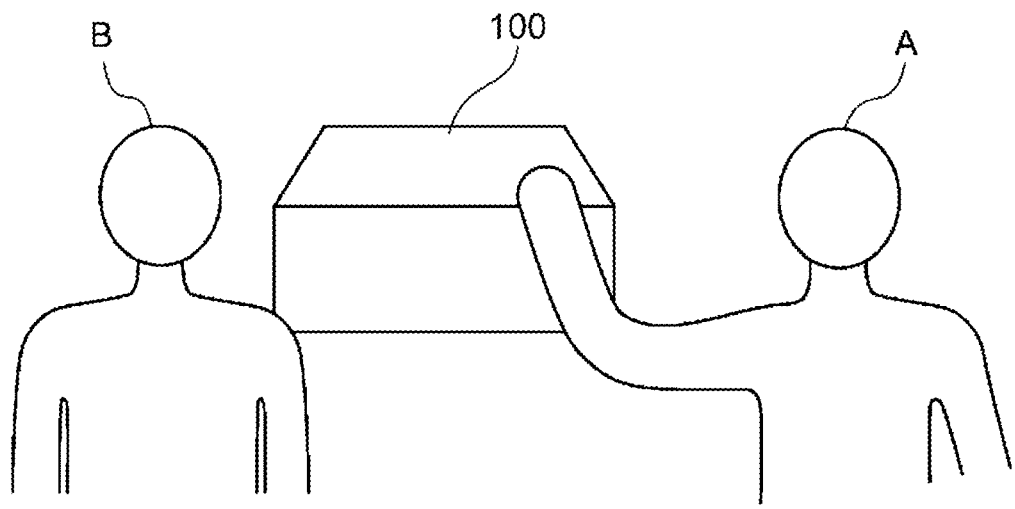
FIG. 4 is a diagram illustrating a situation where an input device may be operated by a plurality of persons.

FIG. 4 is a diagram illustrating a situation where the input device 100 can be operated by a plurality of persons. When it is assumed that a relative positional relationship between the input device 100 and a plurality of persons A and B is unchanged, it is possible to determine which person provides the current input based on the camera image. That is, when the person A provides an input to the input device 100, his left hand is used, and when the person B provides an input to the input device 100, his right hand is used. Therefore, based on the camera image of the input device 100, it can be determined that the input is by the person A when the left hand is detected, and the input is by the person B when the right hand is detected.

For example, a case where the input device 100 according to the embodiment is used as an interface of an automobile and is grounded to a center console of a driver seat and a passenger seat is considered. In this case, by determining the right hand and the left hand based on the camera image, it is possible to distinguish whether the current input is by the driver or a passenger. Thus, it is possible to perform a control such as permitting the input only by a specific person (for example, only by the driver) and excluding the input by other passengers. Of course, conversely, the input by the driver may be excluded and only the input by other passengers may be permitted.

Figure 5:
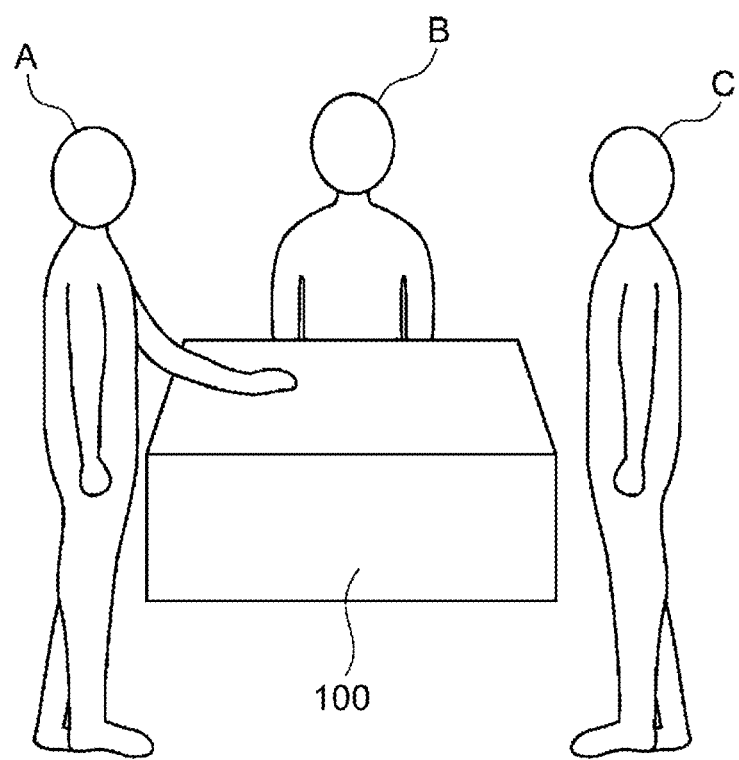
FIG. 5 is a diagram illustrating another situation where the input device may be operated by a plurality of persons.
Figure 6A:
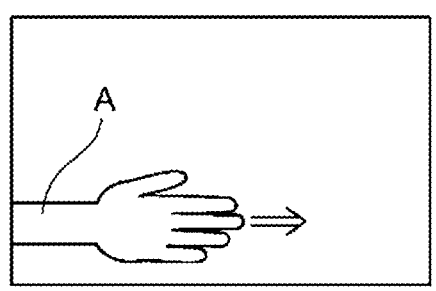
FIG. 6A to FIG. 6C are diagrams illustrating camera images when input by each of a plurality of persons.
Figure 6B:
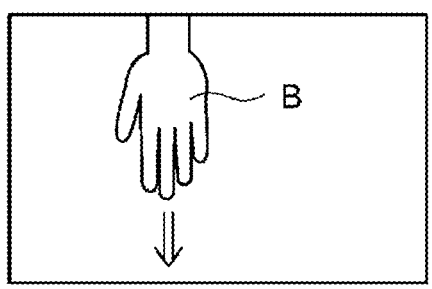
Figure 6C:
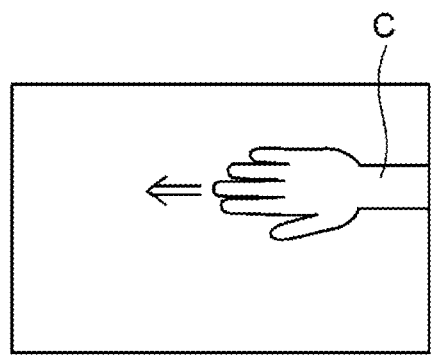

FIG. 5 is a diagram illustrating another situation where the input device 100 can be operated by a plurality of persons. A case where the single input device 100 is operated by a plurality of persons is considered. In this example, a plurality of persons A to C are positioned so as to surround the input device 100. FIG. 6A to FIG. 6C illustrate respective camera images when the persons A to C provided inputs. As illustrated in FIG. 6A to FIG. 6C, it is possible to determine which person provided the input based on a direction in which the hand indicated in the camera extends.

Figure 7A:
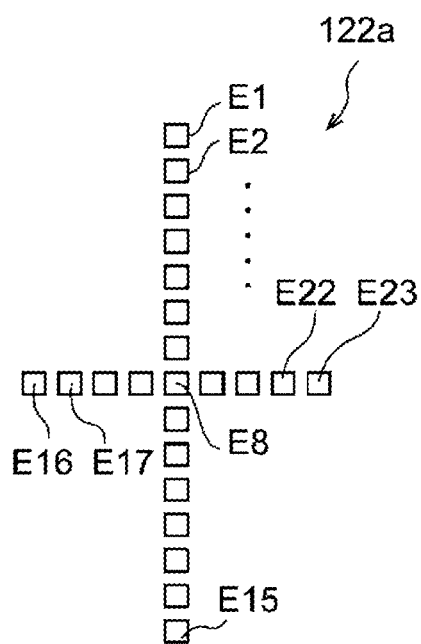
FIG. 7A to FIG. 7D are diagrams illustrating configuration examples of panels.
Figure 7B:
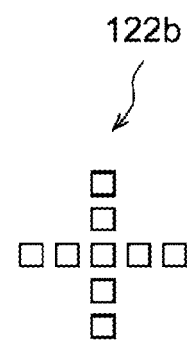
Figure 7C:
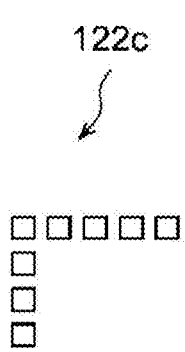
Figure 7D:
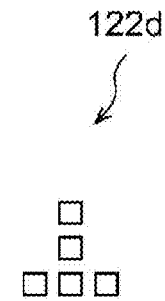

FIG. 7A to FIG. 7D are diagrams illustrating configuration examples of the panel 122. A panel 122a in FIG. 7A includes a plurality of electrodes E1 to E23 arranged in a cross shape. The electrodes E1 to E15 are arranged in the vertical direction, and the electrodes E16 to E23 are arranged in the horizontal direction. For example, a size of one electrode E may be about 10 mm, and an interval may be about 5 mm. FIG. 7A is suitable for input by a palm. A panel 122b in FIG. 7B has a plurality of electrodes arranged in a cross shape like the panel 122a in FIG. 7A, but is suitable for input by a fingertip. Panels 122c and 122d in FIG. 7C and FIG. 7D are also suitable for input by a fingertip (finger tracing).

Figure 8A:
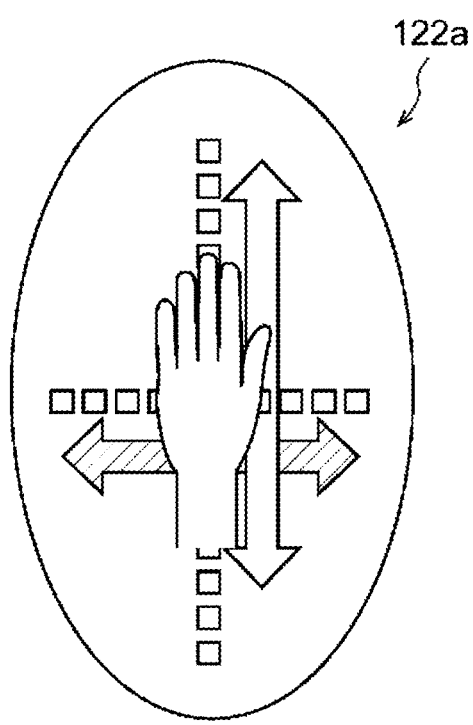
FIG. 8A and FIG. 8B are diagrams illustrating operation inputs to the panels in FIG. 7A and FIG. 7B.
Figure 8B:
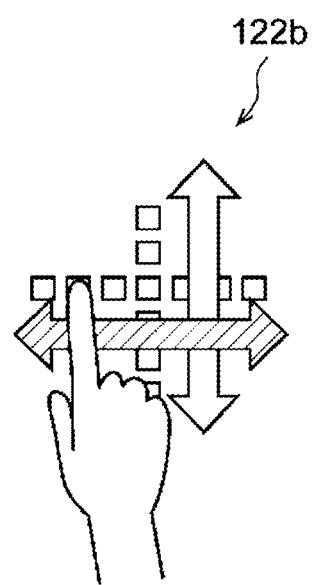

FIG. 8A and FIG. 8B are diagrams illustrating operation inputs to the panels 122a and 122b in FIG. 7A and FIG. 7B. FIG. 8A illustrates an example of input to the panel 122a in FIG. 7A with the palm. FIG. 8B illustrates an example of input to the panel 122b of FIG. 7B with the fingertip.

Figure 9A:
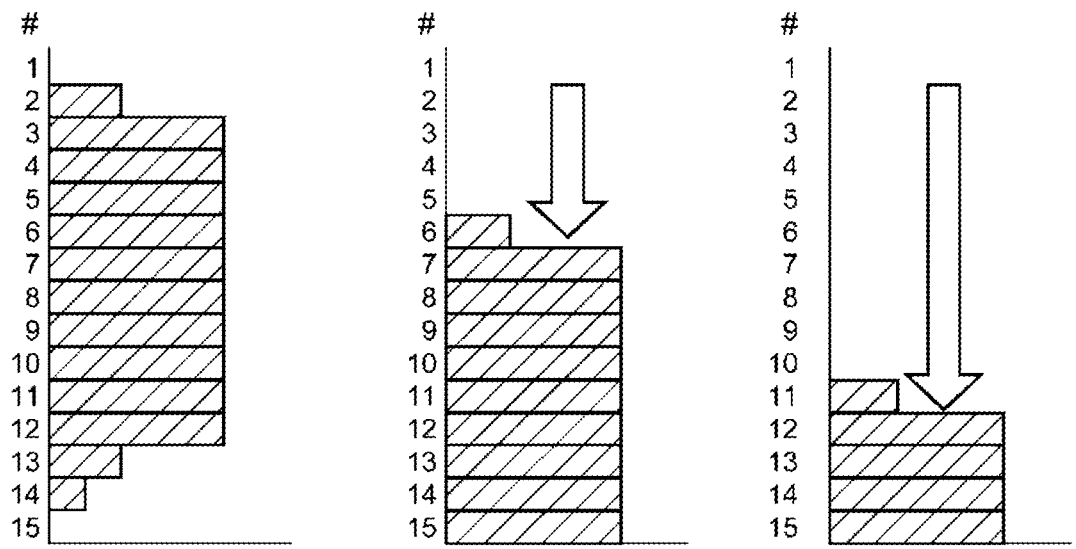
FIG. 9A is a diagram illustrating a change in capacitance of a plurality of electrodes when a hand is moved from top to bottom in FIG. 8A.
Figure 9B:
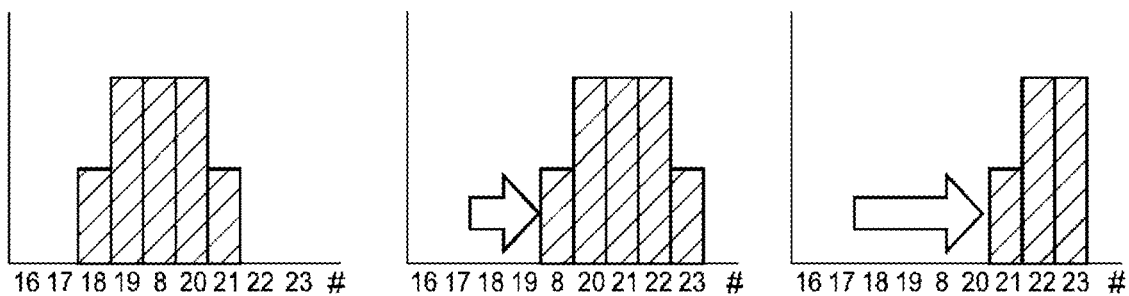
FIG. 9B is a drawing illustrating a change in the capacitance of the plurality of electrodes when the hand is moved from left to right in FIG. 8A.

FIG. 9A is a diagram illustrating changes in capacitance of a plurality of electrodes when the hand is moved from top to bottom in FIG. 8A. Numbers #1 to #23 indicate the number of the electrodes, and a length of a bar indicates the capacitance. FIG. 9B is a diagram illustrating changes in capacitance of the plurality of electrodes when the hand is moved from left to right in FIG. 8A. In this manner, it is possible to detect the movement of the hand based on the changes in capacitance of the plurality of electrodes.

The size and arrangement of the electrodes may be determined according to an assumed user's input part (fingertip, palm, or the like).

Figure 10:
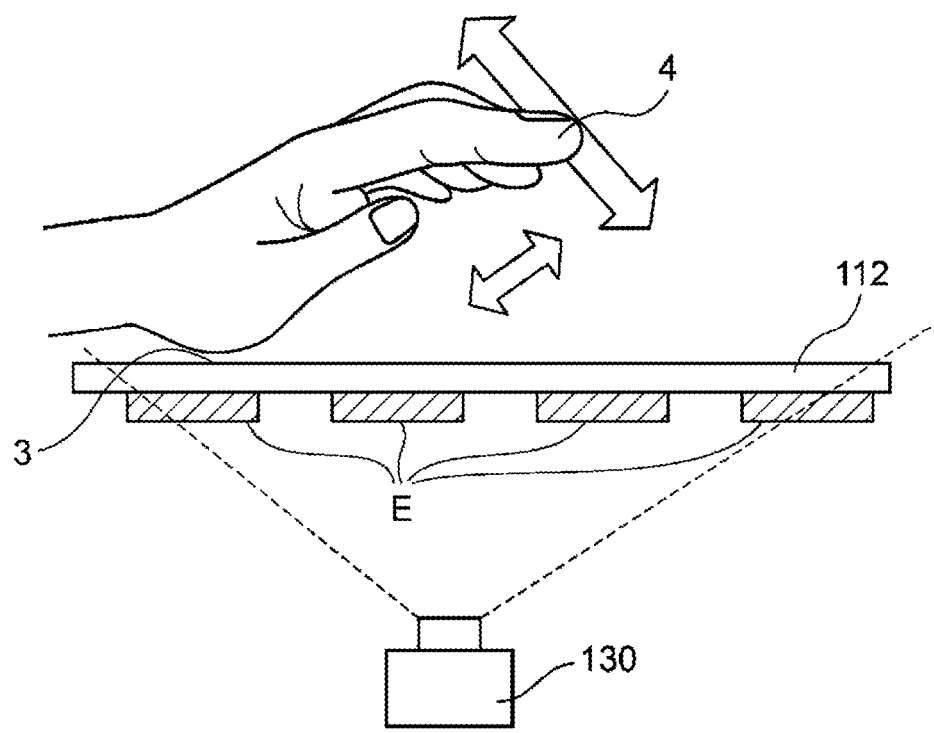
FIG. 10 is a diagram illustrating an example of control based on a combination of a camera image and an output of a touch sensor.

FIG. 10 is a diagram illustrating an example of control based on a combination of the camera image and the output of the touch sensor 120. In this example, various inputs may be provided by moving a predetermined finger 4 (for example, any one of three fingers of index finger, middle finger, and ring finger) with a bottom part 3 of the palm of the hand placed on the panel 122 of the touch sensor 120. The contact of the bottom part 3 of the palm can be detected based on the output of the touch sensor 120, and the movement (bending/stretching or left/right movement) of the finger 4 can be detected based on the image of the camera 130. According to this example, placing the bottom part 3 of the palm on the panel 122 is regarded as an expression of intent by the user to provide an input, and the input by the predetermined finger 4 may be validated.

(Applications)

Figure 11:
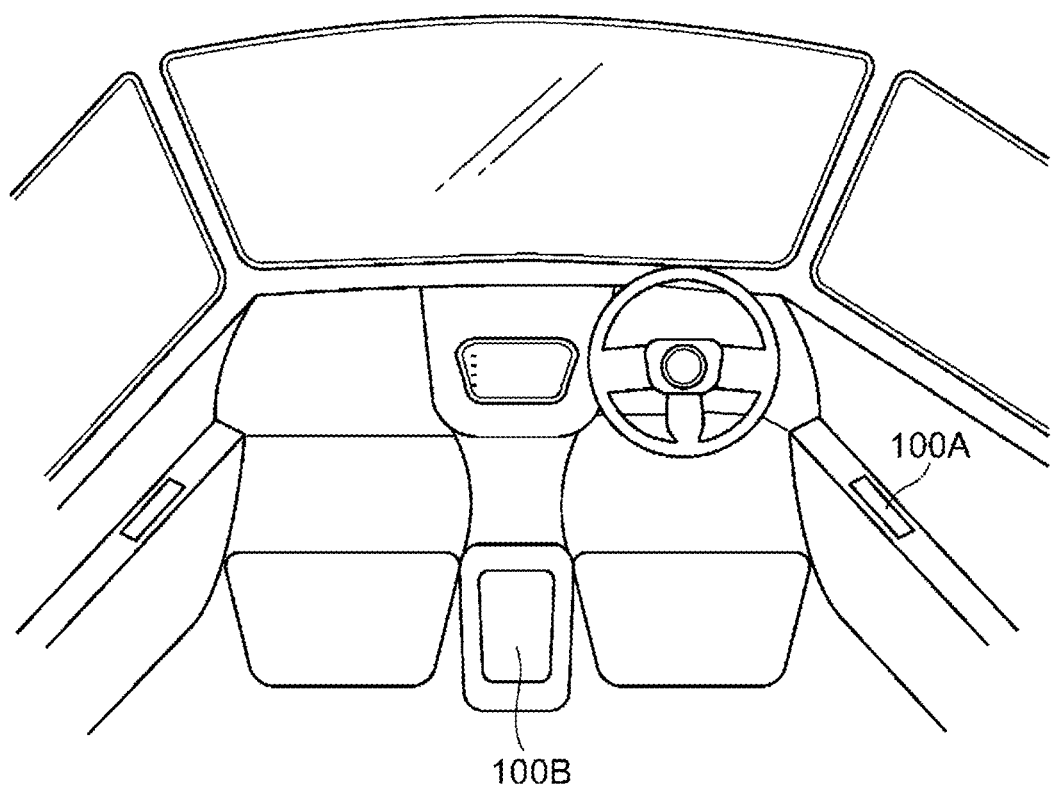
FIG. 11 is a diagram illustrating an interior of an automobile provided with an input device.

The input device 100 has various applications, but may be mounted on, for example, an automobile. FIG. 11 is a diagram illustrating an interior of an automobile including an input device. For example, a suitable example of the installation location of an input device 100B is a door on the side of a driver's seat. Thus, operations of locking or opening and closing windows may be accepted by an input device 100A. Alternatively, apart from such operations, operations (for example, operations of an audio system, a car navigation system, an air conditioner, or the like) may be accepted by the input device 100A. When autonomous driving becomes widespread in the future, an operation input required for autonomous driving may be accepted by the input device 100A.

Another example of the installation location of the input device 100B is a console between the driver seat and the passenger seat. An operation required for driving, and an operation of an audio system, a car navigation system, an air conditioner, or the like may be accepted by the input device 100B.

The present disclosure has been described above based on the embodiments. The present embodiments are presented by way of example, and it is understood by a person skilled in the art that various modifications may be made in combinations of each component and each processing process, and such modifications are also within the scope of the present disclosure. Hereinafter, the modifications will be described.

(Modification 1)

Figure 12A:
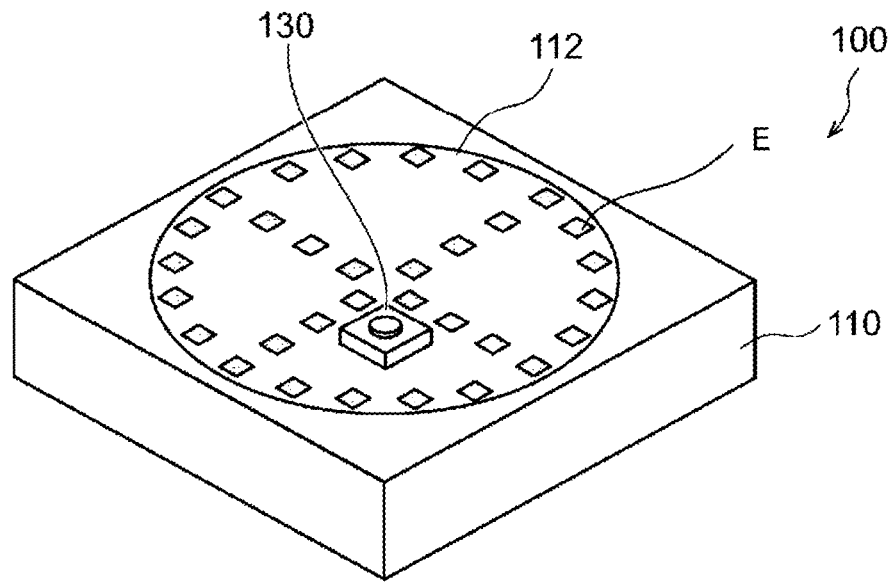
FIG. 12A is a diagram illustrating an input device according to a first modification.

In the description so far, the shape of the base 112 is rectangular and flat, but is not limited thereto. FIG. 12A illustrates an input device 100 according to a first modification of the present disclosure. In the first modification, the base 112 is flat but circular. For example, electrodes E of a touch sensor 120 may be arranged along a circumference of the base 112. In addition to or instead of such an arrangement, the plurality of electrodes may be arranged in a cross shape as described above with reference to FIG. 7A to FIG. 7D.

(Modification 2)

Figure 12B:
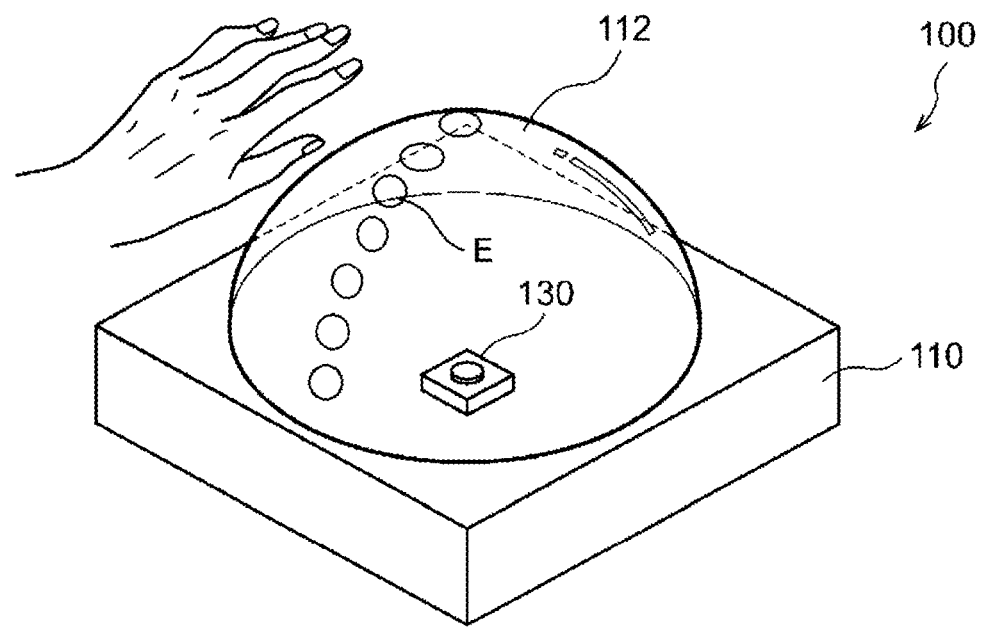
FIG. 12B is a diagram illustrating an input device according to a second modification.

FIG. 12B is a diagram illustrating an input device 100 according to a second modification of the present disclosure. In the second modification, the base 112 has a curved surface, and the touch sensor 120 including the plurality of electrodes E is installed on the base 112. The electrodes E may be circular or rectangular as described above. The shape of the base 112 is not limited thereto. In addition to being the spherical surface of FIG. 12B, the shape of the base 112 may be semi-cylindrical or a curved surface flatter than the spherical surface.

(Modification 3)

Figure 13:
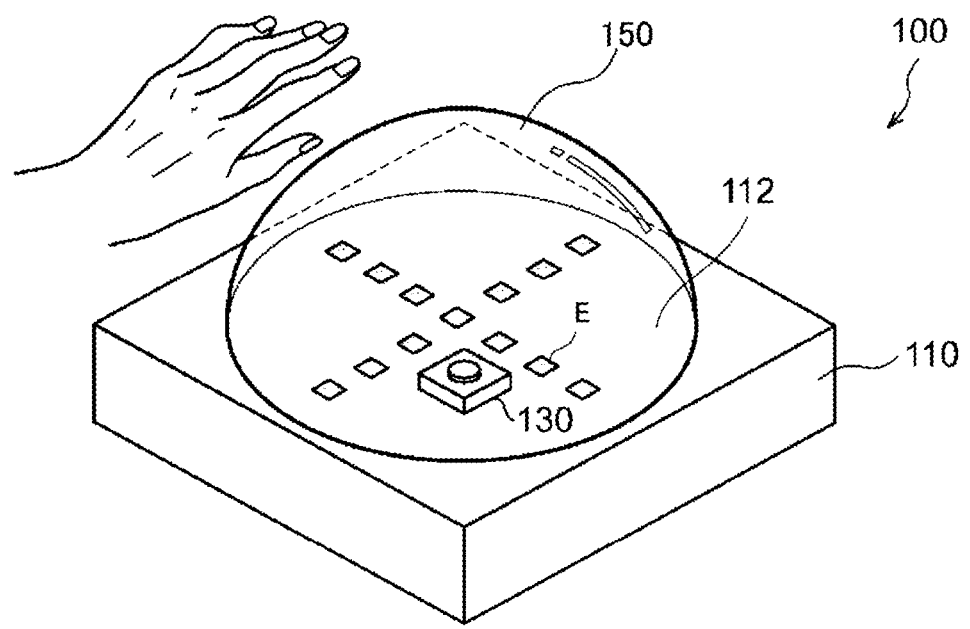
FIG. 13 is a diagram illustrating an input device according to a third modification.

FIG. 13 is a diagram illustrating an input device 100 according to a third modification of the present disclosure. The input device 100 according to the third modification includes a transparent cover 150 installed on the base 112. The transparent cover 150 may have a curved surface, may be semi-spherical as illustrated in FIG. 13, may be a curved surface flatter than a spherical surface, may be semi-cylindrical, or may be flat, but its shape is not limited thereto. According to this modification, the electrodes E of the touch sensor 120 are formed on the flat base 112 and a shape of a part with which the user makes contact may be defined by the transparent cover 150.

(Modification 4)

In the embodiments, the touch sensor 120 of capacitance type is used, but is not limited thereto. When the input is limited to contact, a resistive film sensor may be employed as the touch sensor 120.

(Modification 5)

The application of the input device 100 is not limited to the automobile. For example, the input device 100 is also suitable as an operation interface for medical equipment, game equipment, industrial machines, and industrial vehicles.

(Modification 6)

In the embodiments, the processing part 140 is incorporated in the input device 100, but the present disclosure is not limited thereto, and the processing in the processing part 140 may be assigned to an external processor. In this case, an interface circuit with the external processor may be installed instead of the processing part 140 so that the image data of the camera and the output of the touch sensor 120 can be supplied from the interface circuit to the external processor.

According to the present disclosure in some embodiments, it is possible to provide an input device suitable for detecting an intuitive or rough input using a palm, a finger, an arm, or the like.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An input device configured to be used by a predetermined user, the input device comprising:
    a housing including:
        a transparent base formed flat; and
        a transparent cover formed as a hemispherical curved surface on the transparent base;
    a touch sensor comprising:
        a panel including a plurality of electrodes arranged on the transparent base; and
        a panel controller configured to control the plurality of electrodes and detect capacitance values respectively formed between the plurality of electrodes and a hand of the predetermined user;
    a camera installed inside the housing to monitor an outside of the housing via the transparent base and capable of detecting the hand of the predetermined user via the transparent base; and
    a processor configured to:
        receive an output of the camera and an output of the touch sensor;
        determine a direction of a palm of the predetermined user based on the output of the camera;
        determine a gesture among a plurality of gestures based on the direction of the palm of the predetermined user;
        determine change of the detected capacitance values based on the output of the touch sensor; and
        determine a movement of the hand of the predetermined user based on the change of the detected capacitance values,
    wherein the determining the gesture among the plurality of gestures includes determining the gesture among the plurality of gestures based on whether the palm of the predetermined user is directed to the input device, a back of the hand of the predetermined user is directed to the input device, or the palm of the predetermined user is directed vertically to the input device.

2. The input device of claim 1, wherein the processor is configured to determine a shape of the hand of the predetermined user based on the output of the camera.

3. The input device of claim 1, wherein the input device is to be used by a plurality of users accessing from different directions, and
    wherein the processor is configured to determine which user of the plurality of users provided a current input to the touch sensor based on the output of the camera.

4. An automobile comprising the input device of claim 1.

5. The input device of claim 1, wherein the plurality of electrodes are arranged in a cross shape.

6. An input device configured to be used by a predetermined user, the input device comprising:
    a housing including:
        a transparent base formed flat; and
        a transparent cover formed as a hemispherical curved surface on the transparent base;
    a touch sensor comprising:
        a panel including a plurality of electrodes arranged on the transparent base; and
        a panel controller configured to control the plurality of electrodes and detect capacitance values respectively formed between the plurality of electrodes and a hand of the predetermined user;
    a camera installed inside the housing to monitor an outside of the housing via the transparent base and capable of detecting a first predetermined portion of the predetermined user via the transparent base; and
    a processor configured to:
        receive an output of the camera and an output of the touch sensor;
        determine a direction of a palm of the predetermined user based on the output of the camera;
        determine a gesture among a plurality of gestures based on the direction of the palm of the predetermined user;
        determine change of the detected capacitance values based on the output of the touch sensor; and
        determine a movement of the hand of the predetermined user based on the change of the detected capacitance values,
    wherein the touch sensor is transparent at least in a wavelength region where the camera has sensitivity, and
    wherein the determining the gesture among the plurality of gestures includes determining the gesture among the plurality of gestures based on whether the palm of the predetermined user is directed to the input device, a back of the hand of the predetermined user is directed to the input device, or the palm of the predetermined user is directed vertically to the input device.

* * * * *